United States Patent [19]

Seymour

[11] Patent Number: 5,579,384
[45] Date of Patent: Nov. 26, 1996

[54] TELECOMMUNICATIONS NETWORK SERVICE CENTRAL MANAGEMENT SYSTEM INTERFACING WITH PROTOCOL SPECIFIC REGIONAL STATIONS PROVIDING SERVICES TO SUBSCRIBERS

[75] Inventor: James M. Seymour, Roswell, Ga.

[73] Assignee: Bellsouth Corporation, Atlanta, Ga.

[21] Appl. No.: 474,540

[22] Filed: Jun. 7, 1995

Related U.S. Application Data

[63] Continuation of Ser. No. 198,142, Feb. 17, 1995, abandoned.

[51] Int. Cl.$^6$ .......................... G06F 15/163; H04M 3/22
[52] U.S. Cl. .......................... 379/243; 379/201; 379/207; 379/244; 395/200.11; 395/200.2
[58] Field of Search .................................. 379/201, 207, 379/243, 244; 395/200.11, 200.2

[56] References Cited

U.S. PATENT DOCUMENTS

| | | | |
|---|---|---|---|
| 4,685,125 | 8/1987 | Zave | 379/96 |
| 4,736,402 | 4/1988 | Landis | 379/16 |
| 4,747,127 | 5/1988 | Hansen et al. | 379/94 |
| 4,805,209 | 2/1989 | Baker, Jr. et al. | 379/96 |
| 4,919,545 | 4/1990 | Yu | 380/25 |
| 4,926,495 | 5/1990 | Comroe et al. | 455/54 |
| 4,942,602 | 7/1990 | Baker, Jr. et al. | 379/212 |
| 4,984,234 | 1/1991 | Vergnaud et al. | 370/58.1 |
| 5,008,929 | 4/1991 | Olsen et al. | 379/112 |
| 5,008,930 | 4/1991 | Gawrys et al. | 379/210 |
| 5,056,086 | 10/1991 | Libonati | 370/62 |
| 5,153,884 | 10/1992 | Lucak et al. | 371/32 |
| 5,153,907 | 10/1992 | Pugh et al. | 379/143 |
| 5,182,744 | 1/1993 | Askew et al. | 370/16 |
| 5,193,110 | 3/1993 | Jones et al. | 379/94 |
| 5,212,727 | 5/1993 | Ramkumar | 379/221 |
| 5,241,588 | 8/1993 | Babson, III et al. | 379/201 |
| 5,251,255 | 10/1993 | Epley | 379/242 |
| 5,257,369 | 10/1993 | Skeen et al. | 395/650 |
| 5,282,244 | 1/1994 | Fuller et al. | 379/230 |
| 5,285,494 | 2/1994 | Sprecher et al. | 379/59 |
| 5,309,563 | 5/1994 | Farrand et al. | 395/200 |
| 5,317,630 | 5/1994 | Feinberg et al. | 379/94 |
| 5,353,331 | 10/1994 | Emery et al. | 379/58 |
| 5,377,186 | 12/1994 | Wegner et al. | 370/62 |
| 5,416,781 | 5/1995 | Ruiz | 370/110.1 |
| 5,418,844 | 5/1995 | Morrisey et al. | 379/207 |
| 5,420,090 | 6/1995 | Orriss | 379/201 |
| 5,438,568 | 8/1995 | Weisser, Jr. | 370/60 |

OTHER PUBLICATIONS

AT&T/BellSouth Interim SMS/NE Interface Requirements Definition and Specification—Phase 2, Document No. 237-729-650BT, Jun. 11, 1993 and updates.

*Primary Examiner*—Ken S. Kim
*Attorney, Agent, or Firm*—Kilpatrick & Cody; James L. Ewing, IV

[57] ABSTRACT

Processes and devices for enhancing communication management and control in an intelligent network. A Service Management System Information Model serves as the basis for generation of Network Element Images which facilitate data communication between the Service Management System and the various Network elements. The Service Management System Information Model also allows a more intuitive and efficient provisioning interface for the Service Management System user. Network Element Interfaces according to the present invention contain embedded Service Management System/Network Element Interface Protocol functionality and may be employed to interpret the Network Element Images and communicate them over the network to the Network Elements. A Network Element Interface Server allows requests from client programs in the service management system to be queued and prioritized as desired for further efficiency, flexibility and reliability.

31 Claims, 8 Drawing Sheets

BellSouth AIN SMS Communications Architecture

FIG. 3 — BellSouth AIN SMS Communications Architecture

TELECOMMUNICATIONS NETWORK SERVICE CENTRAL MANAGEMENT SYSTEM INTERFACING WITH PROTOCOL SPECIFIC REGIONAL STATIONS PROVIDING SERVICES TO SUBSCRIBERS

This is a continuation of application Ser. No. 08/198,142 filed on Feb. 17, 1995, now abandoned.

This invention relates to processes and devices for data communications in intelligent telecommunications networks.

BACKGROUND OF THE INVENTION

Common channel signalling systems such as Signalling System 7 are engendering various sophisticated services for telecommunications subscribers. These new services arise primarily out of these networks' ability to transport out-of-band trunk signaling and database messages separately from the customer voice or data messages that are transported over the telecommunications network.

Intelligent networks which permit even further management and control enhance the potential of these signalling networks. Such intelligent networks afford more efficient specification or modification of tasks such as call routing and services such as performing calling card checks, call screening and identifying callers. They also advantageously and significantly allow real time creation and modification of customized features and services desired by particular subscribers. An example is Personal Number Calling, in which a person may request that she or he be reached at one location for particular times of the day and at another location for other times, all using the same telephone number, but subject to change immediately.

Intelligent networks are well suited to address these new additional demands flexibly, efficiently and reliably. Information relating to the status of services and features desired by subscribers may be maintained in intelligent Network Elements ("NE's") such as conventional Advanced Intelligent Network ("AIN") Service Control Points ("SCP's"), Service Nodes ("SN's"), Intelligent Peripherals ("IP's") or other intelligent network elements which are available for query by central offices, switches and similar elements of the switching network. Changes or updates to that information from network growth, the network itself, new subscribers, new services, a particular service, the desires of a particular subscriber, and any other additions, deletions or updates can be disseminated to the Network Elements from a centralized management system. Such management systems are conventionally known as Operations Support Systems ("OSS's") or Service Management Systems ("SMS's"). An OSS user may specify these sorts of changes on, for instance, a provisioning interface, at which point the OSS automatically and in a coordinated and reliable fashion effects all necessary modifications in data stored in various Network Elements throughout the intelligent network.

Conventional processes for managing data in Network Elements via the Operations Support System require the Operations Support System user to be confronted with detailed, low level representation of the data stored in the Network Elements in order to operate on that data and make necessary changes and updates. This awkwardness arises primarily because conventional Operations Support System provisioning interface displays typically correspond very closely to actual Network Element data so that the user must be acquainted with multiple equipment and data configurations in order to make changes reliably.

Conventional nonmodular processes also make it difficult to ensure that the Operations Support System is compatible with multiple Network Element and component types, configurations and protocols. Conventional processes often Situate the functionality for compliance with network interface protocol in the programs that support various services ("Client Programs"), so that changes in interface protocol, for instance, require changes in each such program. Program complexity, instability and unreliability can be the consequences.

Conventional intelligent network processes are also ripe for management of Requests to various Network Elements generated by Client Programs. Often, the Client Programs are left to compete with one another over the various network interfaces for priority on the network, with inadequate or no queuing, synchronization, prioritization or facility for manual or rules-based control.

SUMMARY OF THE INVENTION

The present invention improves the speed, performance, and reliability of intelligent networks of any type in a number of related ways. First, intelligent networks according to the present invention represent data stored in a Network Element via models which may be transformed in the Operations Support System to give the user a service-oriented view of Network Element data and configuration and thus allow the user to manage these in a more intuitive, efficient and reliable fashion.

The networks also employ these models to create changes in Network Element data by transforming the service-oriented models into images which may be interpreted by the Network Element Interfaces in accordance with network protocol to correspond to models in the Network Elements which in turn correspond to their internal data and configuration and thus effect the data changes. Accordingly, Client Programs are no longer affected by changes in low-level procedures or the details of network configuration. Moreover, deployment options, time dependent state of the network, transient state variables and error recovery issues may be addressed in the Network Element Interface as they interpret these images without involving the higher level programs.

The networks also preferably include a Network Element Interface Server to communicate with the Client Programs and information models in the OSS, to queue and prioritize communication requests generated by the Client Programs, to synchronize data flow, and otherwise to increase the efficiency of the network.

It is accordingly an object of the present invention to partition the intelligent network in a fashion that permits low and high level procedures to be modularized so that status changes at one procedure level may be accommodated independently of other, higher or lower level components or programs for increased flexibility, efficiency and reliability.

It is another object of the present invention to provide processes and devices for modelling information stored in Network Elements in order to increase flexibility, efficiency and reliability of network performance.

It is an additional object of the present invention to provide Operations Support Systems users a service-oriented display of services in order to render management of data quicker, more intuitive, and less prone to error.

It is an additional object of the present invention to provide processes and devices which flexibly and efficiently accommodate changes to the Service Management System, Network Elements, equipment, programming, data, protocols or requirements.

It is a further object of the present invention to provide processes and devices which allow queuing and prioritizing of Requests from Operations Support Systems Client Programs to Network Elements in order to synchronize data and otherwise enhance intelligent network performance.

Other objects, features and advantages of the present invention will become apparent with respect to the remainder of this document.

DETAILED DESCRIPTION

Figure 1:
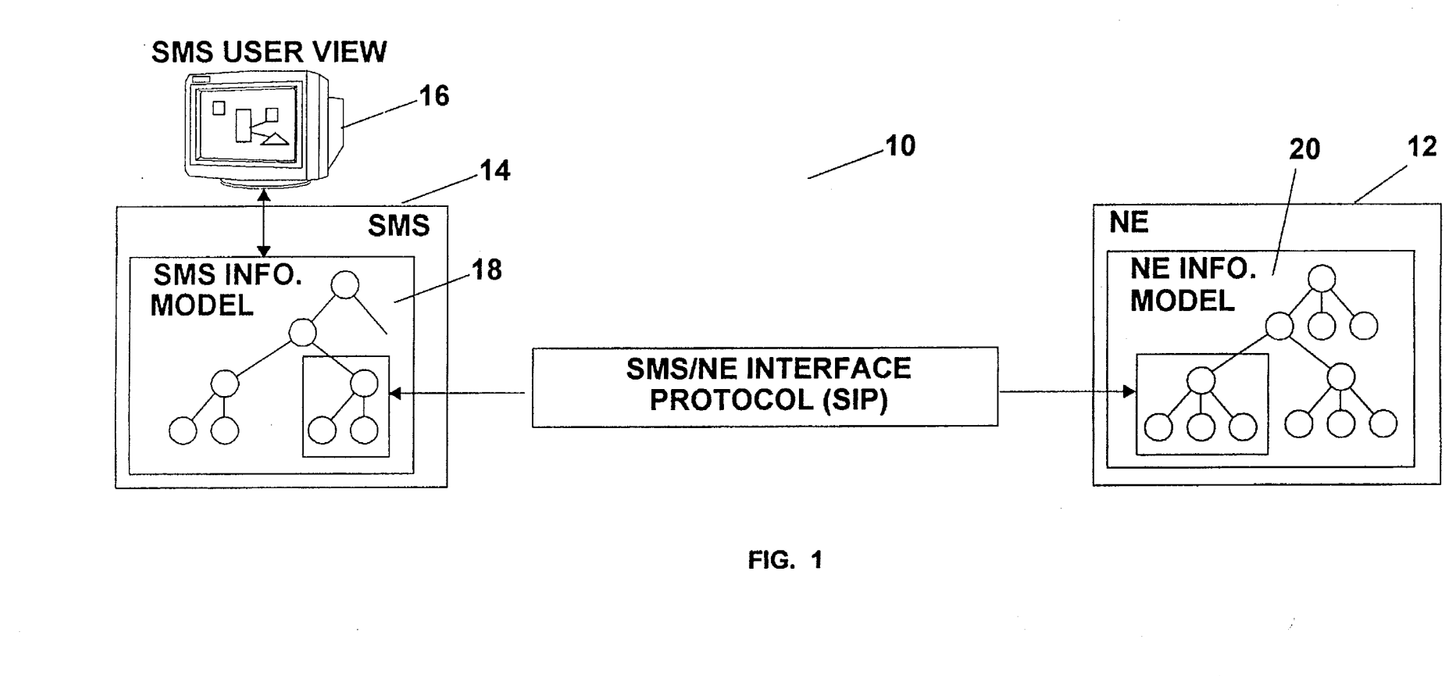
FIG. 1 is a high-level representation of Information Models of networks according to a preferred embodiment of the present invention.

FIG. 1 is a high level representation of information models of an intelligent network 10 according to a preferred embodiment of the present invention. Network 10 in the present embodiment is an Advanced Intelligent Network, but it need not be so limited. Network 10 may include one or more Network Elements 12 such as Service Control Points or Signal Nodes as supplied by conventional suppliers. Network Elements 12 may be linked via packet switching or as otherwise desired and using a predetermined set of protocols such as those conventionally known collectively as "SMS/NE Interface Protocol" ("SIP") as defined in "AT&T/BellSouth Interim SMS/NE Interface Requirements Definition and Specification - - - Phase 2," Document Number 237-729-650BT dated Jun. 11, 1993 and updates thereto. Other protocols may just as easily be employed. The Network Elements 12 are also linked via the network to an Operations Support System or Services Management System 14 which enables a number of users to manage Network 10 via, for instance, a number of provisioning interfaces or user views 16.

At a very abstract level, a primary purpose of SMS 14 is to convert the data that it stores, of whatever type or structure which may be necessary or relevant to operation or management of network 10 (such data referred to collectively hereinbelow sometimes as an "SMS Information Model 18"), into data that a Network Element 12 can use to provide a service to a subscriber. Such services may include, for instance, caller identification, personal number calling, area number calling, and an unlimited range of standard or customized services that the market may desire or demand in the future.

SMS Information Model 18 thus represents the Service Management System version of data which must be sent to (or received) from a Network Element 12. The Network Element Information Model 20 represents the data required by a particular Network Element 12 such as that shown in FIG. 1. The Service Management System 14 employs the SIP to build the data structures of the NE Information model. The SMS User View 16 is an abstract representation of an intelligent network service based upon the SMS Information Model 18.

Figure 2:
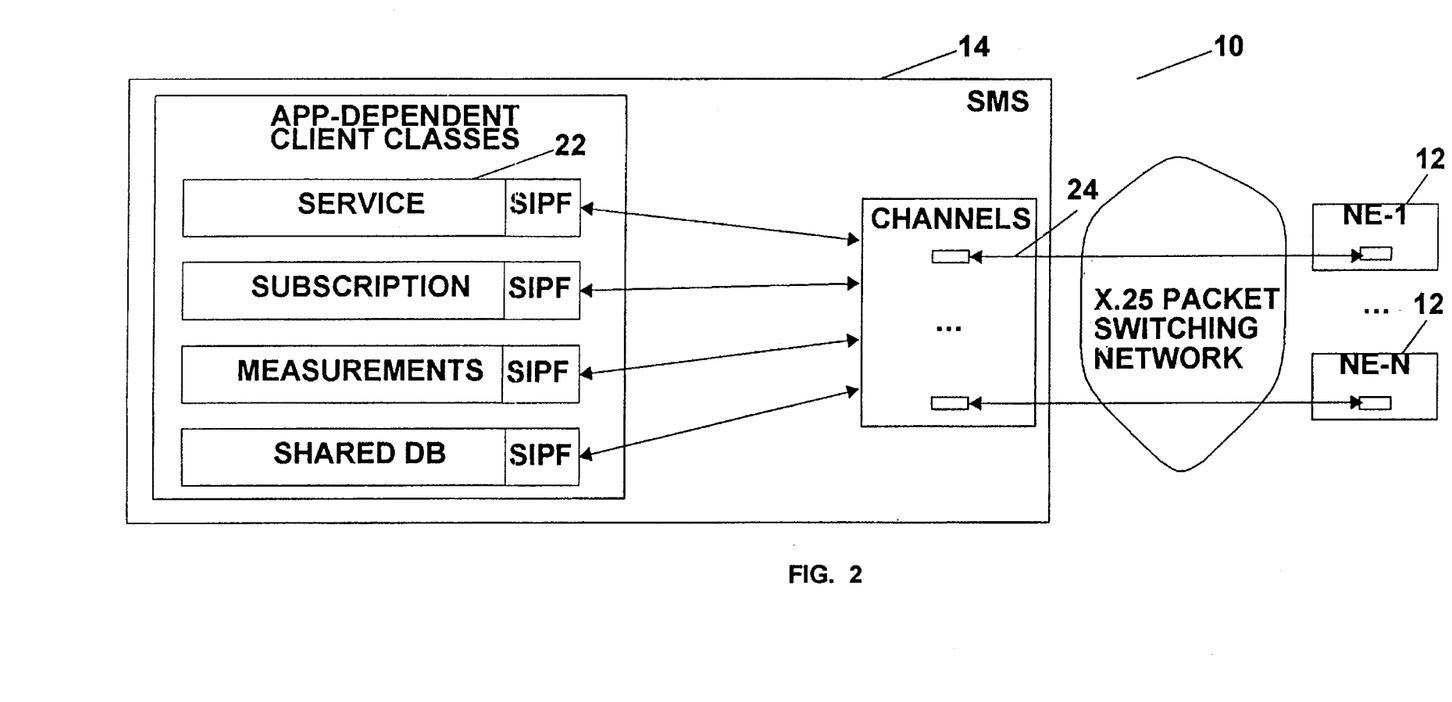
FIG. 2 is a high-level representation of conventional intelligent network interface architecture.

Numerous Client Programs 22 as represented schematically in FIG. 2 in Service Management System 14 manage different aspects of the SMS Information Model 18 and typically must communicate with many different Network Elements 12 and Network Element types. As shown schematically in FIG. 2, one conventional architecture is to allow Client Programs 22 to communicate over network 10 to Network Elements 12 by embedding SIP Functionality ("SIPF") into the Client Programs 22. The programs thus more directly transfer information to and from the Network Elements 12 through a Services Management System/Network Element Interface 24 (which in conventional fashion connects each of a number of channels to a corresponding Network Element 12 across the network 10). That is, the SIP Functionality is substantially distributed among SMS Client Programs 22. FIG. 2 shows the logical relationship between Client Program 22 classes (each representing any number of Client Programs 22) and the Network Elements 12.

This conventional distributed SIPF architecture creates a number of problems. First, and in general, the closer or more directly a Client Program must accommodate a protocol such as SIP, the more complexity required. Programs are often fragile in that upgrades and changes tend to break functionality and introduce subtle problems. Second, not all Network Elements "speak the same version" of SIP, thus requiring each Client Program 22 to maintain complex SIPF modules which escalate development and maintenance time, effort and expense. Third, each time a new version of SIP is added, all Client Programs 22 using it must be modified and tested. Fourth, such architecture renders it difficult to coordinate message traffic on a particular SMS/NE Interface 24. Numerous Client Programs 22 require access to a Network Element 22 and usually feature at least several and sometimes many functions which may be performed. In a distributed system, it is difficult to control Client Program 22 access to the SMS/NE Interface 24.

One upshot of these problems is that intelligent network services are much more difficult, if not impossible, to deploy on a competitive interval. To provide intelligent network service competitively, the Service Management System 14 architecture must be easily extensible with a minimum of delay and effort.

The Network Interface Module

Figure 3:
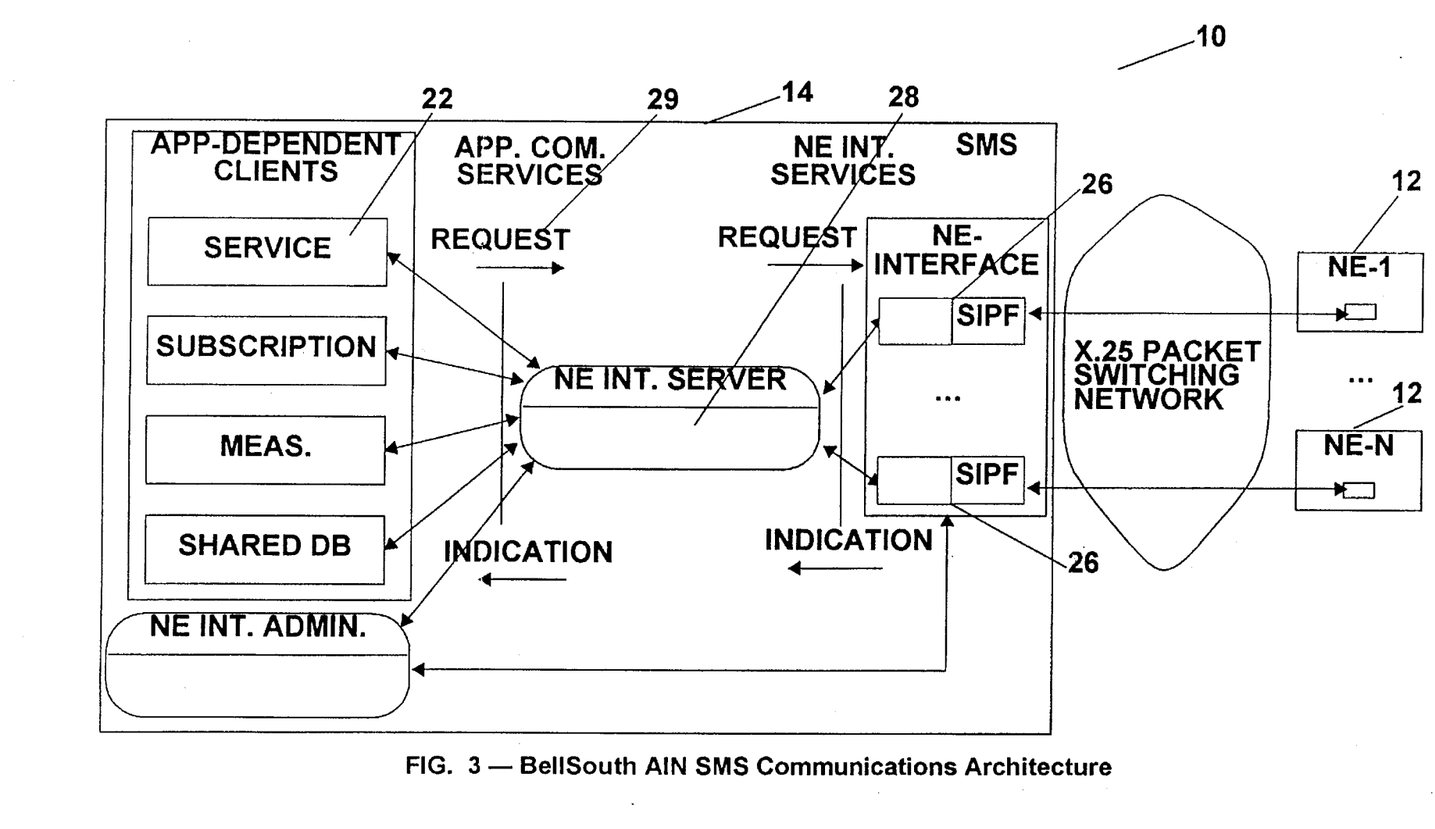
FIG. 3 is a high-level representation of intelligent network interface architecture according to a preferred embodiment of the present invention.

FIG. 3 is a high level representation of intelligent network interface architecture according to the present invention. Note that the Client Programs 22 do not contain SIP Functionality as was shown in the conventional architecture of FIG. 2. SIPF is instead bound to a module referred to for purposes of this invention as the "Network Element Interface" or "NeInterface 26" which, in turn, is bound to a particular Network Element 12. That is, the NeInterface 26 "understands" (via SIP Functionality) the language and protocol of the Network Element 12 to which it is assigned. The Client Programs 22 exchange information with the Network Elements 12 via an NeInterface Server 28 and individual NeInterface 26 associations assigned to each Network Element 12.

SIPF Functionality according to the present invention may be thought of as converting service-independent Requests 29 into vendor-specific and/or NE specific operations on an SMS/NE Interface. Abstractly, service-independent messages flow between the NeInterface Server 28 and NeInterfaces 26. In the case of data import or export Requests 29, one or more NeImages 30 (as discussed below) may be associated with a Request 29. Steps for handling a Request 29 according to a preferred embodiment of the present invention are as follows:

1. SIPF decodes a Request 29 for a particular action with respect to an SMS/NE Interface. A Request 29 can include operations such as creating, updating, or deleting data objects such as a Subscription, Service, or Shared data.

2. Depending upon the type of Request 29, SIPF decodes the appropriate attributes (arguments) of the Request 29. For each type of Request 29 and argument of a Request 29, SIPF rules determine the specific action to be taken. For example, creating a new Subscription may imply a particular sequence of messages on one or more channels of the SMS/NE Interface 26 (an NeInterface 26 may have specialized channels for handling different types of data). The SIPF rules must account for the type and version of Interface involved.

3. SIPF includes rules for dealing with each class of Network Data Object ("NDO"). These rules may include information on the order of export/import of NDOs, the specific SIP message to use, and SIP message parameters. For example, to export a Table NDO, SIPF may sequentially retrieve certain Tuples from the Table NDO and map them into arguments of one or more "UpdateTable" messages. The UpdateTable messages are then sent to the Network Element 12, respecting the specifications of the particular SMS/NE Interface used for addressing Table objects in the Network Element 12.

4. The NeInterface 26 may preempt the processing of one Request 29 to process another Request 29. In this case all state information must be saved upon preemption and restored upon resumption.

5. When a Request 29 terminates due to completion or failure, the originator of the Request 29 (e.g., the Client Program 22) is notified, perhaps via the NeInterface Server 28.

This NeInterface 26 partitioning creates several advantages. Software modules are simpler because only one version of SIP is required for a particular NeInterface 26. Changes to one NeInterface 26 eliminate or reduce the effect on other NeInterfaces 26 or the Client Programs which use them. This potential thus simplifies the task of adding new Network Element types as well as of adding new versions of SIPF to accommodate changes in an Network Element's SIP.

NeInterface Server Functionality

Client Programs 22 preferably communicate according to the present invention with Network Elements 12 via an NeInterface Server 28 functionality as shown in FIG. 3. The NeInterface Server 28 receives Requests 29 from Client Programs 22 and causes work to be performed via the NeInterface 26 resources.

Figure 6:
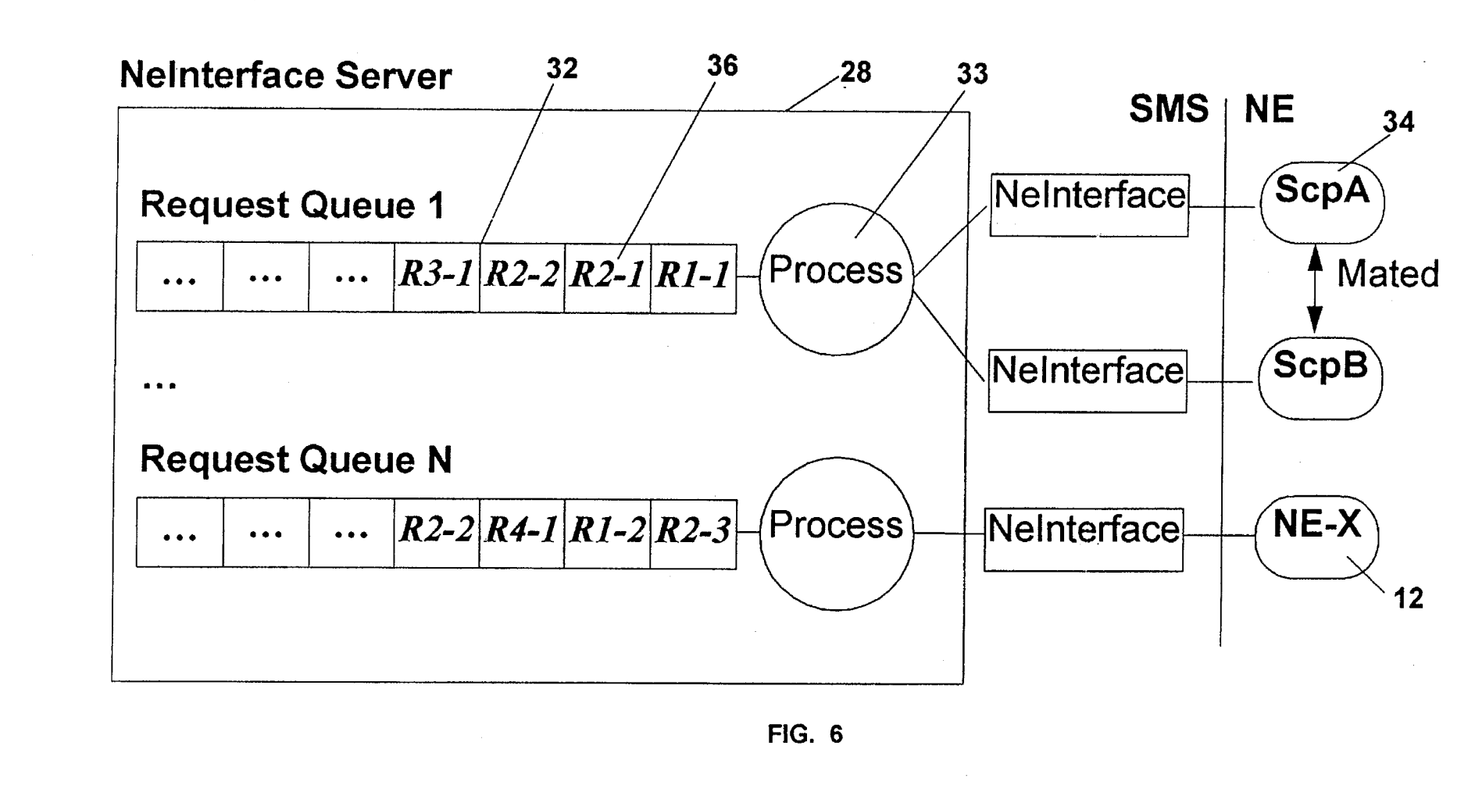
FIG. 6 is a high-level representation of Network Element Interface Server structure with examples of Network Element Configurations according to a preferred embodiment of the present invention.
Figure 7:
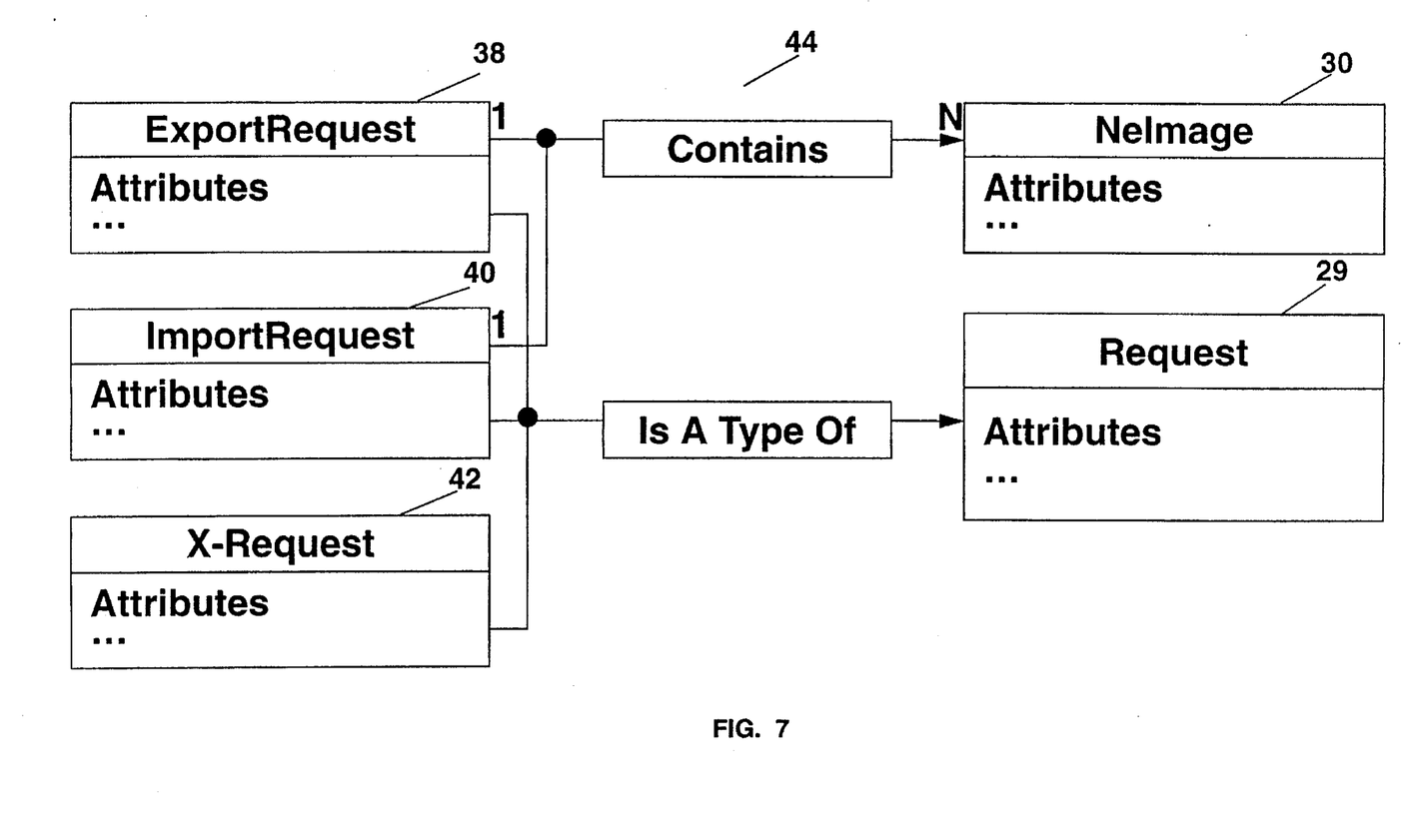
FIG. 7 is a high-level representation of a Request structure for a Network Element Interface Server according to a preferred embodiment of the present invention.

The NeInterface Server 28 according to a preferred embodiment of the present invention, as represented in FIGS. 6 and 7, is a collection of Request Queues 32 and associated queue processing functionality 33. A Request Queue 32 is assigned to one or more Network Elements 12, depending upon the defined function of the Request Queue 32. FIG. 6 shows Request Queue 1 assigned to two mated Service Control Points 34, for instance, ScpA and ScpB. Request Queue N is connected to a single Network Element 12, perhaps an Service Node N, broadband switch, or stand-alone SCP.

Request Class Objects 36 as shown in the Server 28 in FIG. 6, are designated as R<Client Program>-<Request Id>. For example, R1-1 is Request Id 1 for Client Program 1 and R2-3 is Request Id 3 for Client Program 2. The order of the Queue 32 as shown in FIG. 6 (but without limitation) is left to right with the front (or highest priority) Request being the right-most Request (i.e., R1-1 for Request Queue 1 and R2-3 for Request Queue N) and lesser priority requests toward the rear.

The NeInterface Server 28 receives Requests 29 from Client Programs 22 in the Service Management System 14 and assigns them to the appropriate Request Queue 32. Alternately, a Client Program 22 may specify the target Request Queue 32. FIG. 7 shows examples of Request subclasses. Export Requests 38 and Import Requests 40 are subclasses of Requests 29 which contain NeImages 30. Other types of Requests 29, represented by X-Request 42, may perform such functions as returning Network Element 12 measurements, time, or status data to the client.

The processing strategy for Request Queues 32 is as follows:

1. Request Queues 32 are "priority queues," meaning that the ordering (from front to rear) of Requests 29 is dependent upon the Requests' priority. A Request priority may be fixed or dynamic, depending upon the Request subclass. A priority may be a simple integer value or a complex combination of Request attributes such as time of arrival, request type, etc.

2. Requests are processed in the order of their position in the Request Queue 32 at the time when a new Request 29 can be processed. That is, when, Queue Processing Logic (QPL) is able to process another Request 29, it will accept the Request 29 at the front of the Request Queue 32.

3. One or more Requests 29 may be processed concurrently, depending upon the nature of the Request 29 and the capabilities of the SMS/NE Interfaces 24 or NeInterfaces 26 associated with the Request Queue 32.

4. Assuming Requests cannot be processed concurrently, QPL may preempt processing of a Request 29 to service a higher-priority Request 29. The preempted process is later continued at the point of preemption and processing continues until completion or another preemption.

5. At the completion of processing, QPL may notify a Client Program 22 of the results. It is also possible that processing of a Request 29 may be suspended (rather than terminate) until further instructions from the Client Program 22 are received.

7. In processing a Request 29, a Request Queue 32 may perform coordination among several Network Elements 12. For example, data to be exported to mated pairs of Network Elements 12 may require very tight synchronization. Therefore, QPL may direct the NeInterface 26 objects to export data in a special sequence or with a special protocol in insure synchronization between Network Elements 12.

8. QPL may resolve the value of certain Request parameters at the time of processing to enable the most recent information to be used. This strategy may be used to compensate for long queue delays.

9. One SMS/NE Interface 24 or NeInterface 26 could be associated with more than one Request Queue 32. The communications between a Request Queue 32 and an NeInterface 26 may be abstract and general since most of the vendor-specific structures are defined by the NeImage 30 referenced in Request Queue/Interface communications.

Architecture that includes the NeInterface Server 28 according to the present invention creates the following advantages, among others. First, the Service Management System 14 is more robust and resilient to change. Because the Client Programs 22, NeInterface Server 28, and NeInterfaces 26 are independent, changes to one module have little, if any, direct effect on other modules. Second, Client Program 22 Requests 29 are queued according to several factors such as the priority of the request type and the target Network Elements 12. The queuing scheme enables the NeInterface Server 28 to process Requests 29 in accordance with their relative importance, as otherwise specified or manually and in the most efficient sequence. Third, the NeInterface Server 28 is well adapted easily to control data synchronization across multiple Network Elements 12. Fourth, the priority queue processing strategy facilities preemption of low priority requests by higher-priority requests.

NeImages

Figure 4:
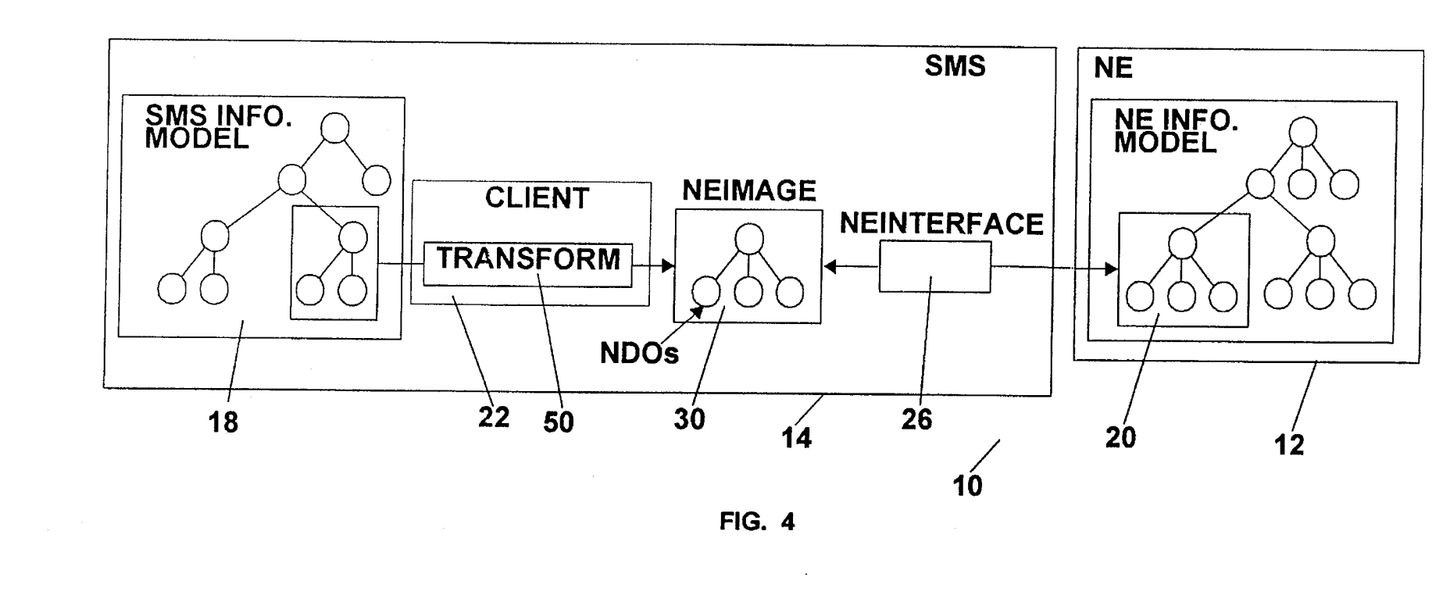
FIG. 4 is a schematic representation of data conversion processes according to a preferred embodiment of the present invention.
Figure 5:
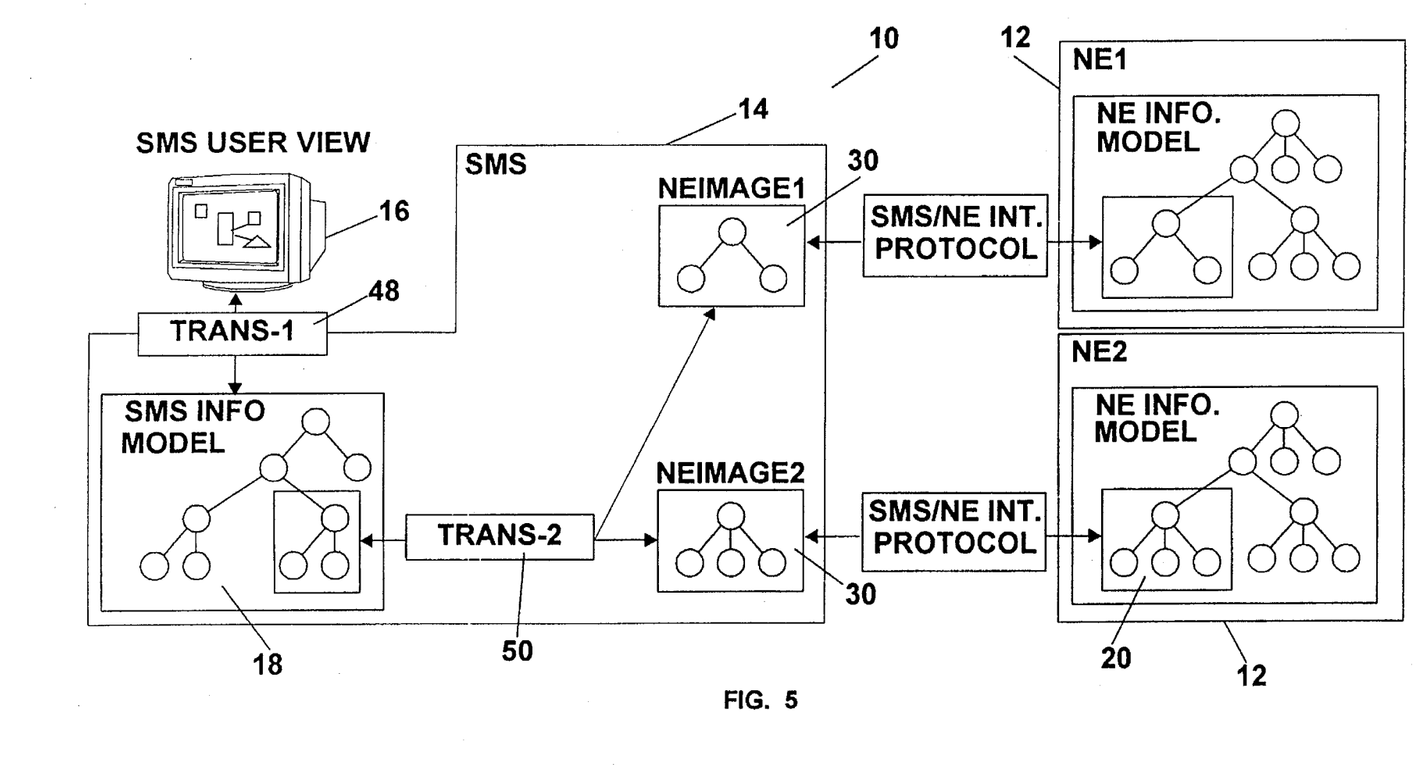
FIG. 5 is a schematic representation of data management and conversion processes according to a preferred embodiment of the present invention.
Figure 8:
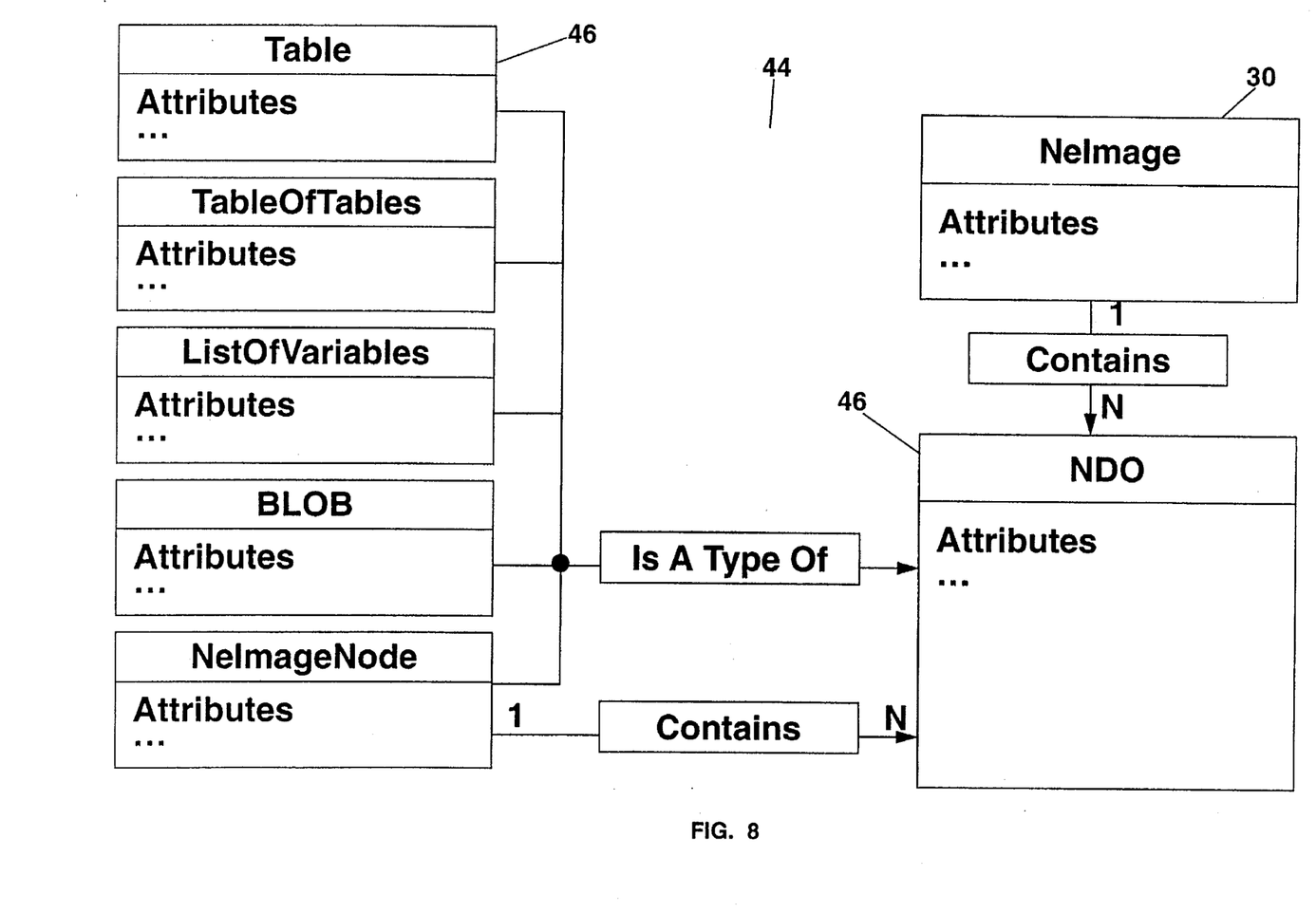
FIG. 8 is a high-level representation of the structure of a Network Element Image according to a preferred embodiment of the present invention.

NeImage data structure as shown schematically in FIGS. 4, 5 and 8 is employed according to the present invention to increase the flexibility of the Service Management System 14 and to decrease complexity of the Client Programs 22 which implement new services. Using the messages provided by SIP, there are numerous possible procedures for transferring data between the Service Management System 14 and Network Elements 12. As SIP is enhanced over time, these procedures usually change to take advantage of new SIP features. If the Client Programs 22 or NeInterface Server 28 were required to specify low-level procedures for data transfer (an obvious implementation choice), there would be a significant churn in platform and/or application code as new services and SIP functionality is added. NeImages 30 according to the present invention enable low-level procedures to be performed by the NeInterfaces 26.

An NeImage 30 as represented in FIGS. 4, 5 and 8 is a collection of one or more Network Data Objects ("NDOs") which model high-level data structures in the NE. These Network Element data structures may be of the type fundamental to NE architecture such as the AT&T Network Element architecture. Thus the structure and behavior of NDOs are stable across services. Intelligent network services according to the present invention utilize one or more NeImages 30 which contains data for export or import from one or more Network Elements 12. When a Client Program 22 submits a Request 29 to the NeInterface Server 28, the appropriate NeImage 30 is constructed (preferably but not necessarily in the Client Program 22) based upon data in the SMS Information Model 18. When the appropriate NeInterface 26 communicates with its Network Element 12, data are moved to or from the NeImage 30 according to the low-level procedures of the NeInterface 26. Thus, the Client Program is only required to deal with a high-level (stable) model and the NeInterface 26 is relegated the low-level procedures which are subject to change in time. FIG. 4 shows the general flow of a data export to the Network Element 12.

FIG. 8 shows the general structure of an NeImage 30. NeImage 30 structures model the abstract data in Network Elements 12. Since each intelligent network service is likely to have unique data structures and the Service Management System 14 is intended to support multiple-vendor Network Elements 12, the NeImage 30 must be capable of representing a variety of data relationships.

Discussion of data structures in this document according to a preferred embodiment of the present invention is caveated with the following qualifications. The data structures as discussed herein are all abstractions and are presented in Object Model or Entity-Relationship diagrams. FIG. 8, for example, represents a preferred embodiment of an Object Model 44 for the NeImage 30 structure. This Model 44 consists of Object Classes 46 with class names at the top and implicit attributes in the lower part of the class box. The specific attributes of these classes are not specified since there are a number of well-known ways to assign attributes to classes, depending upon the implementation.

Note that attributes are implied by the text describing the Models (below). The relationship between Classes 46 are shown by lines terminated by arrows. A line (or group of lines) is labeled according to the relationship being described. Numbers next to a Class 46 indicate the number of object instances in a relationship; if no numbers are present, a one to one relationship may be assumed. The relationship "Is A Type Of" is analogous to defining a subclass (or subtype).

The use of an Object Model 44 does not imply a particular implementation. That is, the Object Classes 46 may be implemented as conventional data structures in programming languages such as C/C++, Ada, etc., or as objects in object-oriented programming languages such as C++. Similarly, object persistence may be achieved through conventional database storage techniques such as SQL or object-oriented databases.

Dynamic behavior (system functionality) defined in this document is an abstraction and can be implemented in numerous well known ways. Although behavior may be attributed to an object, this does not preclude a "loose" (i.e., non-object) binding of the object data structure and the program code which implements the behavior.

Messages between objects or subsystems may be implemented in numerous ways. Messages and responses may be encoded in conventional data structures, database records, objects, or binary streams according to well known methods, for instance. Messages may be carried between objects or subsystems via conventional function calls, invocation of object operations, Inter-Process Communications ("IPC") facilities, streams, or pipes.

The representation shown in FIG. 8 or the discussion herein should not be construed as reflecting any intent to infer a loose or tight coupling between objects in systems according to the present invention or a particular physical partitioning of subsystems. These may be accomplished to suit the needs and the tastes of the developer consistent with the system being implemented and its environment.

In the preferred embodiment shown in FIG. 8, each NeImage 30 class contains attributes which enable the NeInterface 26 to determine the root of the target data structures in the Network Element 12. For example, if an NeImage 30 contains Network Data Objects (NDOs) which target an AIN Subscription, the NeImage 30 would contain sufficient identification for the NeInterface 26 to form SIP messages which target the Subscription. An NeImage 30 may be specialized to distinguish, for example, an NeImage targeting a Subscription from one targeting Service data.

An NeImage 30 according to the embodiment shown in FIG. 8 contains one or more Network NDOs. An NDO is typically specialized into an Abstract Data Type which represents certain common or vendor-specific data structures. As such, an NDO has operations defined for it which enable a Client Program 22 or NeInterface 26 to add or retrieve data in a service-independent way. An NDO also typically contains attributes which enable the Client Program 22 or NeInterface 26 to interpret the underlying data in the context of a service. Examples of specialized NDOs (i.e., NDO subclasses) and typical operations and attributes are described below:

1. Table - - - an aggregation of homogeneous Tuple objects which contain data values. Table NDO operations may enable Tuples to be inserted, updated, deleted or read. A Table NDO may be specialized to a vendor-specific data structure such as an S11Ndo to accommodate table-type Recent Change structures of AT&T architecture. Attributes enable the NeInterface 26 properly to identify the Table and Tuple field names in the SIP messages.

2. TableOfTables - - - an aggregation of Table objects which has similar operations for tables as a Table has for Tuples. TableOfTables may be used for addressing variable-length arrays of tables. Attributes identify the TableOfTable names used in the SIP messages.

3. ListOfVariables - - - an aggregation of non-homogeneous Tuple objects which contain data values. A Tuple may have one element, such as an integer, or multiple elements such as a Date (month, day, year). Attributes enable the NeInterface 26 properly to identify the Tuple field names in the SIP messages.

4. BLOB (Binary Large Object) - - - contain arbitrary binary data, analogous to a common computer file. Operations may enable a BLOB to be read or written. Attributes enable the NeInterface 26 properly to identify the target object name in the SIP messages. A BLOB may be specialized to represent a Decision Graph, Voice File, FAX File, etc.

5. NeImageNode - - - enables a hierarchial, tree-like structuring of NDOs. This is denoted by the recursive containment relationship. That is, an NeImageNode contains one or more NDOs, which may contain one or more NeImageNodes. An NeImageNode may be specialized to represent a vendor-specific node. Attributes enable the NeInterface 26 properly to identify the target node name in the SIP messages.

The NeImage strategy creates several advantages and features. Client Programs 22, for instance, are not affected by changes in low-level procedures. Moreover, new Client Programs 22 can be implemented quickly and reliably because they are only responsible for constructing an NeImage 30 which consists of only a few unique NDO types. Additionally, Client Programs 22 are not involved in the details of network configuration; these variables are resolved by the NeInterfaceServer 28 for all clients. Client Programs 22 using NeImages 30 are also not involved in deployment options or the time-dependent state of the network. Note that data can be transferred between the Service Management System 14 and a Network Element 12 in a number of modes. For example, only data changes since last update could be sent to save transmission time. A number of factors, including the current state of the Network Element 12, affect the mode of transfer. Because the NeImage 30 is "interpreted" by the NeInterface 26, it can handle transient state variables and error recovery without involving higher-level programs.

Information Models

A principle of human-computer interface design is that the computer should display information to the user in a "natural" form. For example, a calendar tool should "look" like a calendar rather than rows of data which represent a calendar. Similarly, a Service Management System 14 user should not be required to deal with the implementation details of the AIN service. Conventional Service Management Systems present the user with a Network Element-specific representation of a subscription. This is essentially the equivalent of displaying one or more raw NeImages to the user. Using this strategy, the service implementation may be severely constrained. First, large or complex Network Element 12 data structures are not practical because a user may not be able to provision such structures. Second, the service implementation is limited to one logic module in one Network Element 12.

The Service Management System 14 architecture according to the present invention departs from the conventional wisdom by decoupling the provisioning interface 16 from the NE implementation. A preferred embodiment of this architecture is represented in FIG. 5. The user sees a unified view of an AIN service based upon the SMS Information Model 18. A transformation procedure 48, Transform 1, presents a service-oriented display to the user based upon data in the SMS Information Model 18. When data is to be deployed to the Network Elements 12, another transformation procedure 50, Transform 2, converts between the SMS Information Model 18 and the NeImages 30.

Note that the SMS Information Model 18 may or may not contain data structures analogous to the constructed NeImages 30. For example, the SMS Information Model 18 may contain verbatim copies of the NeImages 30 or the data could be in a completely different form. In any case, the Transform 2 procedure must know how to construct the target NeImages 30.

The SMS Information Model 18 is an arbitrary representation of information. It may be implemented with common tools available for building databases and user interfaces. The NE Information Model 20 for a particular AIN Service is represented by one or more NeImages 30 which may be associated with one or more types of Network Elements 12. The feature of the Service Management System 14 which enables the support of these two models is the service-specific transformation functions.

The transformation functions may be part of Client Programs 22. The major operations requiring transformations are the export and import processes which move data between the SMS Information Model 18 and the Network Elements 12. The strategy for export transformation is as follows:

1. When an export function is invoked for a subscription or other Service Management System object, a sequence of service-specific transformations may take place. For example, if a Subscription is implemented on two Network Element 12 types (e.g., an SCP and SN), the first level of transformation may require that the export be partitioned into two export requests and sent in sequence or in parallel, depending upon the implementation requirements.

2. Before a request can be completed by the NeInterface, a service-specific transformation function is invoked. This transformation function "understands" the SMS Information Model 18 and the NE Information Model 20 for the target Network Element 30. The result of the transformation is the NeImage 30 containing the data to be exported to the target Network Element 12.

3. When a new version of an existing service is deployed, transformation functions must support both the new and old versions concurrently.

The strategy for an import operation is similar, but rather than take data from an NeImage 30, the NeInterface 26 preferably places data received from a Network Element 12 into an NeImage 30. In this case, a Client Program 22 must have created an NeImage 30 template for the NeInterface 26 to use for importing values. A template is an empty NeImage 30 and associated NDOs with the necessary attributes to identify what is to be imported. When an NeImage 30 has been imported, a transformation function converts the NeImage 30 into data structures in the SMS Information Model 18 domain for presentation to the Service Management System 14 user or other application.

The Split Information Model strategy creates several advantages and features, including the following:

1. The provisioning interface can be optimized for user convenience and understanding.

2. The Network Element implementation can be optimized for call processing.

3. The service implementation is transparent to the provisioning user, can span multiple Network Elements, and multiple logic modules within a Network Element.

4. The user can be isolated from Network Element service software release migration. By definition, a new release has a new NeImage 30. Since the user view 16 and NeImages 30 are separate transformations of the SMS Information Model 18, changes in the NeImages 30 to fix problems do not necessarily require the SMS User View 16 to change.

5. Release migration is facilitated by the ability to construct both old and new NeImages 30 from the new-release SMS Information Model 18. In this case two transformation procedures are provided, one for the old and one for the new version NeImage 30 set.

6. The creation of a service compiler tool is facilitated, for the process of adding new services to the Service Management System largely constitutes defining data structures and creating transformation functions which can all be built via parameterized procedures.

7. Support of new Network Element 12 types is facilitated. Major Service Management System changes are limited to adding new transformation procedures and a NeInterface 26 module to be assigned to the Network Element 12.

The foregoing describes a preferred embodiment of the present invention. Various changes and modifications to what is disclosed may be adopted or implemented without departing from the scope or spirit of the invention.

What is claimed is:

1. A system for communication between a public switched telecommunications network service management system, which is adapted to manage and control, in a centralized fashion, data relating to changes in service provided to subscribers of said system, and a plurality of network elements, at least some of which are adapted to provide data for services offered to said subscribers of said public switched telecommunications network, which elements are available for query by central offices and switches of said public switched telecommunications network, using at least one predetermined protocol for communicating between said service management system and said network elements, said system comprising at least one network element interface, each said interface corresponding to one of said network elements and communicating with said element, each interface adapted to be programmed to transform said public switched telecommunications network service management system data relating to changes in services provided to subscribers of said system into a format that complies with said predetermined protocol.

2. A system according to claim 1, further comprising at least one network interface server for processing communications between portions of said public switched telecommunications network service management system and said network element interface.

3. A system according to claim 1 in which each network element interface is adapted to be programmed independently of the other interfaces.

4. A system according to claim 1 in which each network element interface is adapted to be programmed independently of the other interfaces in order to accommodate changes in its corresponding network element.

5. A system according to claim 1 in which each network element interface is adapted to be programmed independently of the other interfaces in order to accommodate changes in the predetermined protocol.

6. A system according to claim 2 in which said network element interface server is adapted to queue communications from client programs in the public switched telecommunications network service management system.

7. A system according to claim 2 in which said network element interface server is adapted to control data synchronization across said network.

8. A system according to claim 2 in which said network element interface server is programmable.

9. A system according to claim 8 in which said network element interface server is adapted to be programmed independently of said network element interfaces.

10. A system for communication between at least one client program contained in a public switched telecommunications network service management system, which is adapted to manage and control, in a centralized fashion, data relating to changes in service provided to subscribers of said system, and a plurality of network elements, at least some of which are adapted to provide data for services offered to said subscribers of said public switched telecommunications network, which elements are available for query by central offices and switches of said public switched telecommunications network, using at least one predetermined protocol for communicating between said service management system and said network elements, said system comprising:

a. means for generating network element images in at least some of said network elements, which images correspond to data structures within said network elements, said data structures relating to said services offered to said subscribers of said public switched telecommunications network; and b. a plurality of network element interfaces, each corresponding to one of said network elements, adapted to interpret network element images, and communicating with said element.

11. A system according to claim 10 further comprising at least one network interface server for processing communications between said network element images and said network elements via said network element interfaces.

12. A system according to claim 10 in which said public switched telecommunications network service management system contains an information model, and said network element image generation means is adapted to utilize data stored in said information model to construct said images.

13. A system according to claim 10 in which each image contains at least one network data object.

14. A system according to claim 10 in which said means for generating network element images are contained within said client programs.

15. A system for communication between at least one client program contained in a public switched telecommunications network service management system, which is adapted to manage and control, in a centralized fashion, data relating to changes in service provided to subscribers of said system, and a plurality of network elements, at least some of which are adapted to provide data for services offered to said subscribers of said public switched telecommunications network, which elements are available for query by central offices and switches of said public switched telecommunications network, using a predetermined protocol for communicating between said service management system and said network elements, said system comprising:

a. means for generating network element images in at least some of said network elements, which images correspond to data structures within said network elements, said data structures relating at least in part to services offered to said subscribers of said public switched telecommunications network;

b. a plurality of network element interfaces, each corresponding to one of said network elements and communicating with said element, each interface adapted to be programmed to transform data into a format that complies with said predetermined protocol; and c. at least one network interface server for communications between said network images and said network elements via said network element interfaces.

16. A system according to claim 15 in which said means for generating network images are contained within said client programs.

17. A system for communication between a public switched telecommunications network service management system, which is adapted to manage and control, in a centralized fashion, changes in data relating to service provided to subscribers of said system, and a plurality of network elements, at least some of which are adapted to provide data for services offered to said subscribers of said public switched telecommunications network, which elements are available for query by central offices and switches of said public switched telecommunications network, using a predetermined protocol for communicating between said service management system and said network elements, said system comprising:

a. a service management system information model contained within said public switched telecommunications network service management system;

b. a network element information model which represents at least some of said data in at least one of said network elements for services offered to said subscribers of said public switched telecommunications network;

c. a plurality of network images, each corresponding to data structures within and in communication across said network with at least one of said network elements; said data structure relating to said services offered to said subscribers of said public switched telecommunications network; and d. means for transforming data stored within said network element information models into data that accommodates said public switched telecommunications network service management system, which means is in communication with at least one of said network element images.

18. A system according to claim 17 in which said means for transforming data is also adapted to transform data stored within said service management system information model into data that accommodates at least one network element information model.

19. A system according to claim 17 which further comprises a provisioning interface coupled to the public switched telecommunications network service management system and adapted to present a service oriented display of network element related information to the user, and means for transforming data stored in said service management system information model into data usable by said provisioning interface.

20. A system according to claim 19 which further comprises means for transforming data entered into the provisioning interface into data usable by said public switched telecommunications network service management system for deploying data to said network elements.

21. A system for communication between a public switched telecommunications network service management system, which is adapted to manage and control, in a centralized fashion, data relating to changes in service provided to subscribers of said system, and a plurality of network elements, at least some of which are adapted to provide data for services offered to said subscribers of said public switched telecommunications network, which elements are available for query by central offices and switches of said public switched telecommunications network, said system comprising:

a. a public switched telecommunications network service management system information model which contains data corresponding to said data in said network elements;

b. means for generating from said service management system information model at least one network element image for communication to at least one of said network elements which image corresponds to data structures within at least one of said network elements of said public switched telecommunications network, said data structures relating to said services offered to said subscribers of said public switched telecommunications network; and c. means for communicating said network element image to said network.

22. A system according to claim 21 in which said communication means comprises a network element interface which is adapted to interpret said network element image and communicate it to said network element in accordance with a predetermined public switched telecommunications network service management system/network element interface protocol.

23. A system according to claim 22 in which said communications means further comprises a server which is adapted to queue and prioritize requests from client programs in said public switched telecommunications network service management system that contain network element image data.

24. In an intelligent public switched telecommunications network system containing a service management system, which is adapted to manage and control, in a centralized fashion, data relating to changes in service provided to subscribers of said system, and a plurality of network elements at least some of which are adapted to provide data for services offered to said subscribers of said public switched telecommunications network, which elements are available for query by central offices and switches of said public switched telecommunications network, a process for communicating data between said service management system and said network elements, comprising the steps of:

a. creating a network element image of data that is stored in said public switched telecommunications network service management system and that is based on at least one network data object in at least one of said network elements, said data object comprising at least in part data relating to said services offered to said subscribers;

b. interpreting said network element image in order to make it comply with interface protocol, for communicating between said public switched telecommunications network service management system and said network elements; and c. communicating said interpreted network element image to said network elements.

25. A process according to claim 24 in which said public switched telecommunications network service management system contains at least one client program which is adapted to generate requests which contain at least a portion of network element images, and further comprising the steps of incorporating at least one such portion into at least one request, and prioritizing said request before said interpretation step occurs.

26. In an intelligent public switched telecommunications network system containing a service management system, which is adapted to manage and control, in a centralized fashion, data relating to changes in service provided to subscribers of said system, and a plurality of network elements, at least some of which are adapted to provide data for services offered to said subscribers, and which elements are available for query by central offices and switches of said public switched telecommunications network, a process for communicating data between said service management system and said network elements, comprising the steps of:

a. communicating from at least one network element to said public switched telecommunications network service management system a model of information stored in said network element, which information relates to said services offered to said subscribers of said public switched telecommunications network;

b. transforming said model into an image that is adapted to be used by said public switched telecommunications network service management system in order to model data stored in said network element, which image relates to said services offered to said subscribers of said public switched telecommunications network; and c. transforming said image into data that is adapted to be stored in said public switched telecommunications network service management system in order to reflect said data stored in said network element.

27. In an intelligent public switched telecommunications network system containing a plurality of network elements, at least some of which are adapted to provide data for services offered to subscribers of said system, which elements are available for query by central offices and switches of said public switched telecommunications network, and a public switched telecommunications network service management system, which is adapted to manage and control, in a centralized fashion, changes in service provided to said subscribers of said system and to make requests directed to said network elements, a process for communicating at least one of said requests to said network element comprising the steps of:

a. queuing and prioritizing said request relative to other requests generated by said public switched telecommunications network service management system;

b. interpreting said request in order to make it comply with public switched telecommunications network service management system/network element interface protocol; and c. communicating said request to said network element.

28. A process according to claim 27 in which said interpretation step occurs after queuing and prioritizing.

29. In an intelligent public switched telecommunications network having a public switched telecommunications network service management system, which is adapted to manage and control, in a centralized fashion, data relating to changes in service provided to subscribers of said system, with at least one provisioning interface and networked to a plurality of network elements, at least some of which are adapted to provide data for services offered to said subscribers of said system, and which elements are available for query by central offices and switches of said public switched telecommunications network, a process for communicating data to said provisioning interface that corresponds to said data stored in at least one network element for services offered to said subscribers of said system, comprising the steps of:

a. communicating from at least one network element to said public switched telecommunications network service management system a model of information stored in said network element, the information relating a least in part to services offered to said subscribers of said system;

b. transforming said model into an image that is adapted to be used by said public switched telecommunications network service management system in order to model data stored in said network element, said image containing data relating at least in part to services offered to said subscribers of said system;

c. transforming said image into data that is adapted to be stored in said public switched telecommunications network service management system in order to reflect said data stored in said network element;

d. transforming said data that is adapted to be stored in said public switched telecommunications network service management system into a form that is adapted to be utilized by said provisioning interface; and e. communicating said data to said provisioning interface.

30. In an intelligent public switched telecommunications network having a public switched telecommunications network service management system, which is adapted to manage and control, in a centralized fashion, data relating to changes in service provided to subscribers of said system, said service management system having at least one provisioning interface and networked to a plurality of network elements, at least some of which are adapted to provide data for services offered to said subscribers of said system, and which elements are available for query by central offices and switches of said public switched telecommunications network, a process for managing data in said network elements using said provisioning interface comprising the steps of:

a. entering data via said provisioning interface relating to changes in services to subscribers of said system;

b. transforming said data entered via said provisioning interface into a form that is adapted to be stored in said public switched telecommunications network service management system in order to reflect data that is stored in at least one of said network elements;

c. transforming said data that is adapted to be stored in said public switched telecommunications network service management system into an image of said data stored in said network element, said image corresponding to data structures in said network element, said data structures relating to services offered to said subscribers of said system; and d. communicating said image to said network element.

31. A process according to claim 30 further comprising the step of interpreting said image in order to make it comply with public switched telecommunications network service management system/network element protocol before said step of communicating said image to said network element occurs.

* * * * *

UNITED STATES PATENT AND TRADEMARK OFFICE
CERTIFICATE OF CORRECTION

PATENT NO. : 5,579,384
DATED : November 26, 1996
INVENTOR(S) : James M. Seymour

It is certified that error appears in the above-indentified patent and that said Letters Patent is hereby corrected as shown below:

On the cover page under related U.S. Application Data. Please delete "Ser. No. 198,142,Feb.17,1995" and insert -- Ser.No.198,142,Feb.17,1994" -- (See Filing Receipt.)

Column 11, line 65, claim 1. Please delete "services" and insert -- service --

Column 16, line 15, claim 29. Please change "a" to -- at --

Signed and Sealed this

Twenty-sixth Day of August, 1997

Attest:

BRUCE LEHMAN

*Attesting Officer*    Commissioner of Patents and Trademarks